Nov. 19, 1929.  H. A. KNOX  1,736,267
COMPOUND CLUTCH
Filed Oct. 31, 1925  2 Sheets-Sheet 1
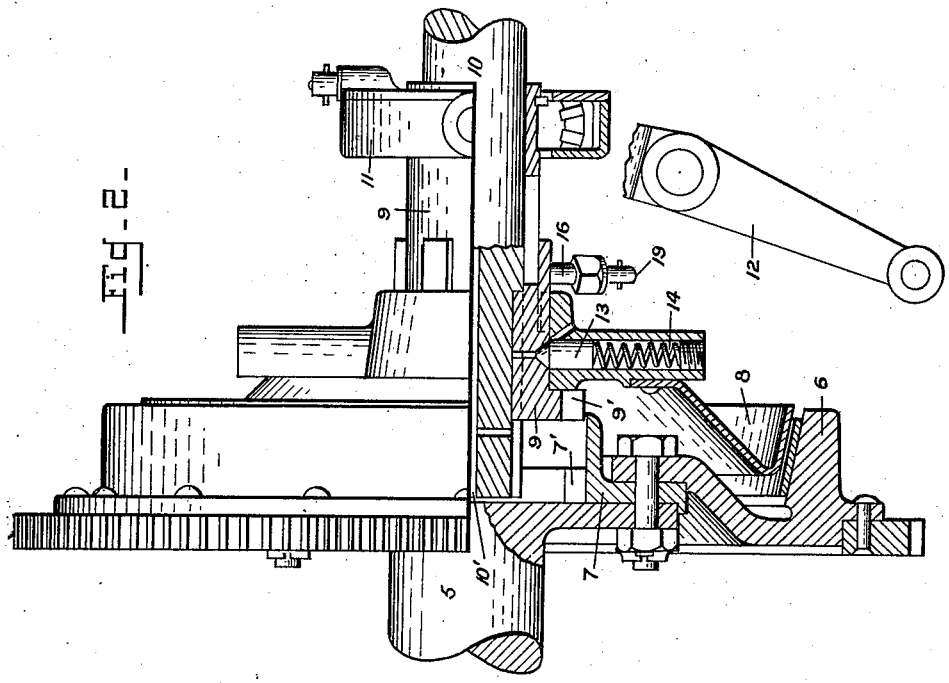
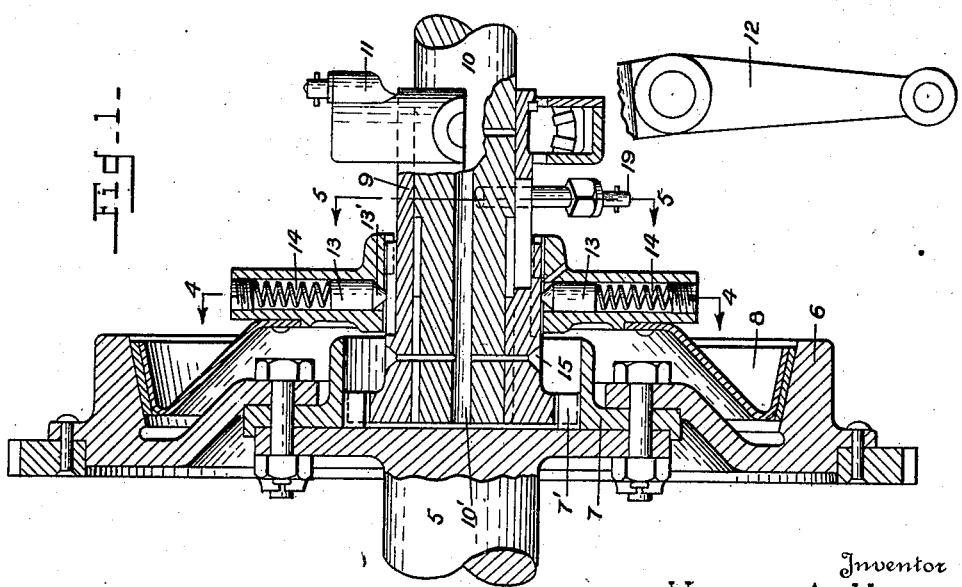
Inventor
Harry A. Knox
By W. M. Roach
Attorney Nov. 19, 1929.                H. A. KNOX                1,736,267
                           COMPOUND CLUTCH
                         Filed Oct. 31, 1925        2 Sheets-Sheet 2
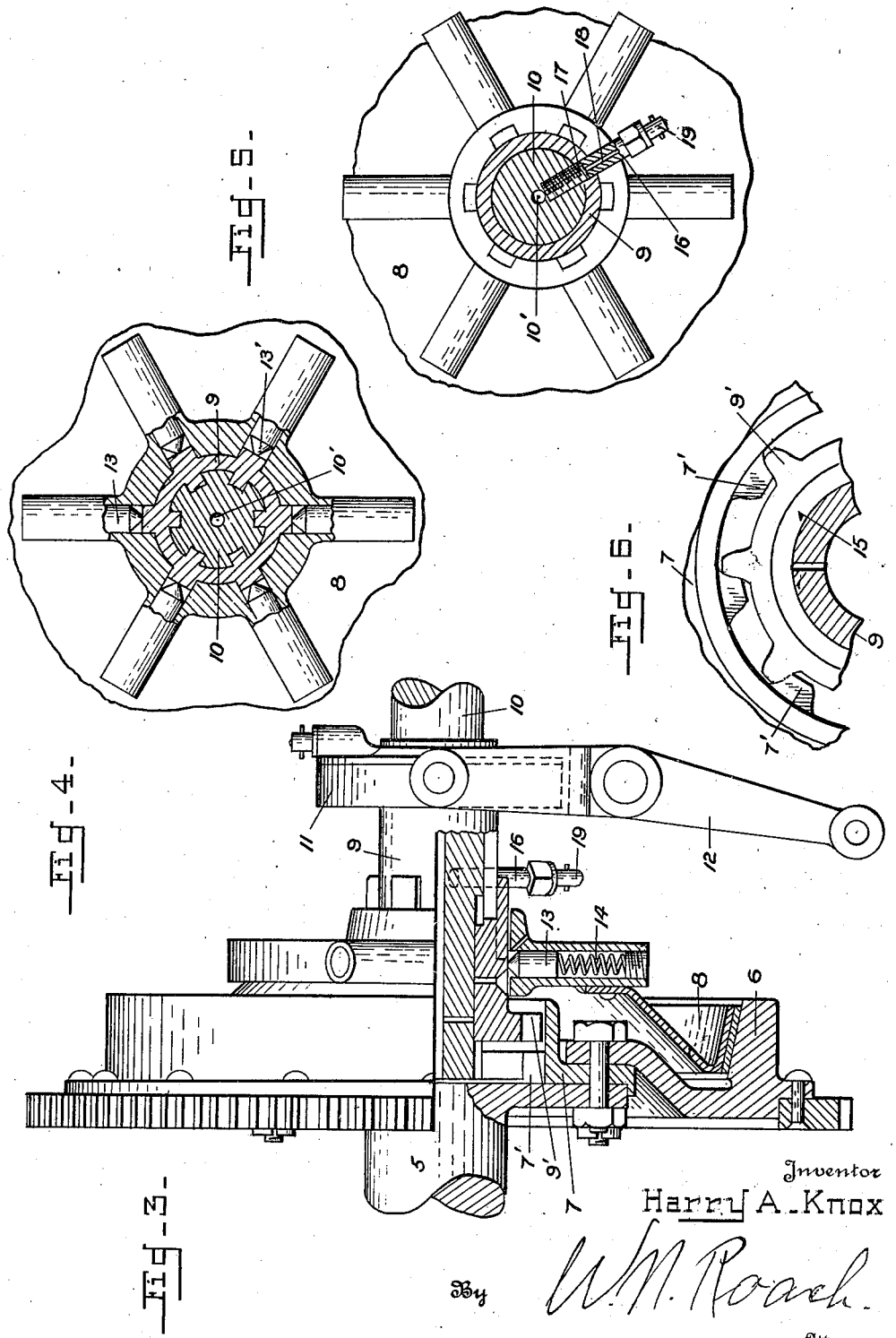
Inventor
Harry A. Knox
By W. M. Roach
Attorney Patented Nov. 19, 1929

1,736,267

UNITED STATES PATENT OFFICE

HARRY A. KNOX, OF DAVENPORT, IOWA

COMPOUND CLUTCH

Application filed October 31, 1925. Serial No. 66,068.

(GRANTED UNDER THE ACT OF MARCH 3, 1883, AS AMENDED APRIL 30, 1928; 370 O. G. 757)

The invention described herein, if patented, may be manufactured and used by or for the Government for governmental purposes without the payment to me of any royalty thereon.

The subject of this invention is a compound clutch.

In vehicles of the track laying type which utilize an epicyclic transmission, it is customary to provide a compound clutch having first a frictional or slipping and then a positive driving engagement. The function of the frictional clutch is to initiate rotation of the driven member of the positive clutch according to engine speed and through this member to pick up and start the transmission drums rotating.

Compound clutches which have heretofore been devised for accomplishing the above purpose are so arranged that additional pressure is placed upon the friction clutch when the positive clutch is being moved into engagement. Consequently, in order for the friction clutch to slip and allow the elements of the positive clutch to line up, it must be overloaded. In the actual operation, however, the friction clutch is moved back and forth until the teeth or splines of the positive drive are properly lined up for engagement.

In the present invention the clutch mechanism is so arranged that initial movement of the positive drive towards engagement causes the friction drive to engage and perform its function and the final movement of the positive drive towards engagement removes the pressure on the friction drive, allowing it to slip and insuring meshing of the positive drive.

To these and other ends, my invention consists in the construction, arrangement, and combination of elements, described hereinafter and pointed out in the claim forming a part of this specification.

A practical embodiment of the invention is illustrated in the accompanying drawings, wherein:

Fig. 1 is a longitudinal sectional view through a compound clutch constructed in accordance with the invention and showing the positive clutch engaged;

Fig. 2 is a similar view showing both clutch units disengaged;

Fig. 3 is a similar view showing the position of the positive clutch unit at the moment when maximum pressure is exerted in moving the friction clutch unit into engagement;

Fig. 4 is a partial sectional view taken on the line 4—4 of Fig. 1;

Fig. 5 is a sectional view on the line 5—5 of Fig. 1; and

Fig. 6 is a fragmentary view in end elevation of the positive clutch.

Referring to the drawings by numerals of reference:

The crank shaft 5 of an engine carries the usual fly wheel 6 formed to constitute the driving member of a friction cone clutch and also carries the driving member 7 of a positive clutch which is provided with internal teeth 7'. The corresponding driven members of the clutches comprise the cone 8 and the sleeve 9, the cone splined on the sleeve and having sliding movement with respect thereto, and the sleeve similarly mounted on the clutch shaft 10.

The sleeve 9 is provided with teeth 9' for meshing with the teeth 7' of the driving member 7 and both sets of teeth are spaced to facilitate engagement by omitting every other tooth as shown in Figure 6.

Movement of the sleeve into and out of engagement is controlled in any suitable manner as by the operating mechanism 11—12.

The movement of the cone 8 is controlled by the sliding sleeve 9 in such a manner that the pressure moving it into engagement with the fly wheel is removed during the final movement of the sleeve preliminary to its engagement with the driving member 7. One method of accomplishing this purpose consists in mounting radially on one of the driven members, preferably the cone 8, a convenient number of spaced plungers 13 formed with conical inner ends 13' adapted under the influence of the plunger springs 14 to enter a peripheral groove 15 in the other driven member, in this instance, the sleeve 9.

In the operation of the device, assuming the clutch to be disengaged as shown in Figure 2, the plungers 13 will be held by their springs in the groove 15 so that when the sleeve 9 is moved forward the cone 8 will be carried along. As the cone engages the fly wheel and is retarded thereby the continued forward movement of the sleeve will force the plungers outwardly against the action of their springs whose resistance is sufficiently great to insure that the cone will engage without slipping. The rotation of the cone will be imparted to the clutch shaft 10 by means of the splines on the cone and sleeve and the transmission drum will accordingly be rotated.

Due to the compression of the plunger springs, the maximum pressure will be applied to the cone as the plungers are about to be forced out of their grooves. At the moment when the plungers have been forced out, the teeth 9' on the sleeve are still a slight distance from engagement, as shown in Figure 3, and since the pressure on the cone is now removed it will begin to slip during the final movement of the sleeve towards engagement. This results in decreasing the speed of rotation which it imparts to the sleeve thus insuring a smooth engagement of that member with its driving member 7. The interval between the release of pressure on the cone and the engagement of the positive clutch is furthermore so regulated that the friction of the epicyclic train will be entirely taken up just at the moment when the positive clutch engages.

On disengaging the clutch the sleeve is retracted pulling its teeth out of mesh and, if the cone has not already moved to the rear, the plungers will enter the groove 15 and the cone will be carried along in this manner. In order to limit the rearward movement of the cone and to insure registration of the plungers in the groove at the commencement of the forward movement of the units there is provided a stop 16 secured to the clutch shaft 10 and disposed in a slot 17 in the sleeve. The stop provides a convenient means for admitting lubricant through passages 10' in the clutch shaft to the bearing surfaces of the sleeve and to this end the stop is formed with a passage 18 for receiving the lubricant through a valve 19 on its outer end.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claim.

I claim:

In a compound clutch, a friction driven member, a positive driven member controlling the movement of the driven friction member and subsequently engaging after releasing the friction member, and a stop member having means for admitting a lubricant to the positive member adapted to limit disengaging movement of the friction member to insure regaining of control by the positive member.

HARRY A. KNOX.